US008457631B2

(12) United States Patent
Choksi et al.

(10) Patent No.: US 8,457,631 B2
(45) Date of Patent: Jun. 4, 2013

(54) DISPATCH NETWORK WITH IMS INTEGRATION

(75) Inventors: Ojas T. Choksi, Farmers Branch, TX (US); Ramesh Kalathur, Fairfax, VA (US); Trinh D. Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1533 days.

(21) Appl. No.: 11/743,057

(22) Filed: May 1, 2007

(65) Prior Publication Data

US 2008/0274735 A1    Nov. 6, 2008

(51) Int. Cl.
*H04W 4/00* (2009.01)
(52) U.S. Cl.
USPC ............. 455/435.1; 455/432.1; 455/432.2; 455/432.3
(58) Field of Classification Search
USPC ............................. 455/432.1–432.2, 435.1
See application file for complete search history.

(56) References Cited

U.S. PATENT DOCUMENTS

| 2004/0034793 | A1* | 2/2004 | Yuan ............................. 713/200 |
| 2006/0120362 | A1* | 6/2006 | Westman et al. ............. 370/389 |
| 2006/0176876 | A1* | 8/2006 | Aborn et al. ................. 370/352 |
| 2007/0027975 | A1* | 2/2007 | Tai et al. ...................... 709/223 |
| 2007/0133517 | A1* | 6/2007 | Miller et al. ................. 370/352 |
| 2012/0244861 | A1* | 9/2012 | Agarwal et al. ............ 455/435.1 |

* cited by examiner

*Primary Examiner* — Dai A Phuong

(57) ABSTRACT

A wireless communications system includes a radio network facilitating wireless communications with a wireless subscriber unit, a dispatch application server providing dispatch communications services to the subscriber unit via the radio network, and an IP Multimedia Subsystem (IMS) infrastructure including a Proxy-Call Session Control Function (P-CSCF) and a Serving-CSCF (S-CSCF). The P-CSCF notifies the dispatch application server of subscriber unit registration events, allowing the dispatch application server to provide dispatch communications services without initiating a separate registration process. Dispatch communications are routed between the wireless subscriber unit and dispatch application server through the P-CSCF, bypassing the S-CSCF of the IMS infrastructure.

17 Claims, 4 Drawing Sheets

DISPATCH NETWORK WITH IMS INTEGRATION

FIELD OF THE INVENTION

The present invention relates generally to wireless communications systems and, more particularly, to systems and methods for providing roaming subscribers with access to wireless application services, such as dispatch communications services.

BACKGROUND OF THE INVENTION

Dispatch services, also known as Push-to-talk (PTT) or walkie-talkie services, provide near-instant, half-duplex communication between a dispatch caller and one or more target dispatch users. Dispatch services are typically offered as subscription services on wireless communications systems, which may also offer interconnect calling, short message service (SMS), packet data and other communications services to wireless subscribers. Each wireless communications system facilitates communications using one or more multiple-access wireless technologies such as code division multiple access (CDMA), global system for mobile communication (GSM) or time division multiple access (TDMA). Known dispatch technologies include Nextel's Direct Connect®, Qualcomm's QChat and Push-to-Talk over Cellular (PoC).

High performance dispatch networks are optimized to minimize communications latencies to achieve near-instant communications desired by dispatch subscribers. Such high performance networks typically include a regional dispatch application server that manages dispatch communications for local wireless subscriber units. To initiate and receive dispatch calls, the wireless subscriber registers with a regional location server and a dispatch application server servicing the network region. When the wireless subscriber roams to a different network (or region), it registers with the new network, which includes notifying the wireless subscriber's home network of its current location and receiving authorization to access local dispatch services.

Various frameworks exist for facilitating the provision of multimedia application services to roaming subscribers, including the IP Multimedia Subsystem (IMS) standard. IMS provides subscriber access to multimedia applications across disparate communications networks and administrative domains. In operation, a wireless subscriber roaming onto an IMS network registers once as an IMS client though the IMS network's Serving-Call Session Control Function (S-CSCF) to access IMS applications that are available through the S-CSCF. Conventional high performance dispatch networks, however, do not offer IMS dispatch application services through the S-CSCF, and require the wireless subscriber to separately register for dispatch and IMS services.

SUMMARY OF THE INVENTION

The present invention is a system and method for providing roaming subscribers with access to wireless application services, such as dispatch communications services. In one embodiment of the present invention, a wireless communications system includes at least one application server adapted to provide application services to a subscriber unit that is in communication with the wireless communications system. The wireless communications system also includes an IP Multimedia Subsystem (IMS) infrastructure that further includes a Proxy-Call Session Control Function (P-CSCF) and a Serving-Call Session Control Function (S-CSCF). The P-CSCF includes SIP subscribe and notify functionality, and is adapted to receive a subscription request from an application server and notify the subscribing application server of new subscriber registrations and associated application specific parameters, in the registration message.

A method performed by the application server for providing non-IMS applications services to the subscriber unit includes transmitting a subscription request to the P-CSCF to receive registration notification messages generated from the P-CSCF, receiving an IMS registration notification message from the P-CSCF, the IMS registration notification including an identifier of the subscriber and application-specific parameters, and providing the subscriber unit with application services through the P-CSCF—in embodiments where the P-CSCF includes a session border control function—while messaging between the subscriber unit and application server bypass the S-CSCF of the IMS infrastructure. In an alternate embodiment, a session border controller is separate from the P-CSCF, and the messaging between the subscriber unit and the application server bypass both the P-CSCF and S-CSCF.

In another embodiment of the present invention, a subscriber unit includes a client application, such as a dispatch client, adapted to communicate with an application server via a wireless network having an IMS infrastructure, and an IMS registration function adapted to request IMS registration from a S-CSCF through a local P-CSCF. After successful IMS registration, all dispatch signaling and media communications between the subscriber unit and application server are routed through the P-CSCF, while bypassing the S-CSCF of the IMS infrastructure. In an alternate embodiment, the signaling and media communications may bypass the P-CSCF if the session border control function is integrated in a separate network element. The subscriber unit may further include an IMS client application, wherein communications between the IMS client application and an IMS application server are facilitated through both the P-CSCF and S-CSCF of the IMS infrastructure.

In another embodiment of the present invention, a wireless communications system includes a radio network facilitating wireless communications with a wireless subscriber unit, and a dispatch application server providing dispatch communications services to the subscriber unit via the radio network. The wireless communications system includes an IP Multimedia Subsystem (IMS) infrastructure, which includes a Proxy-Call Session Control Function (P-CSCF) and a Serving-CSCF (S-CSCF). The P-CSCF is adapted to notify the dispatch application server of subscriber registration events.

A method for dispatch roaming includes registering a subscriber unit with an IMS infrastructure on a home dispatch network and notifying, by the home P-CSCF, a home dispatch application server of the subscriber unit IMS registration. After successful IMS registration, dispatch services are provided to the subscriber unit via the IMS infrastructure of the home dispatch network, such that dispatch call messaging bypasses the home S-CSCF of the home IMS infrastructure. When the subscriber unit roams to a visited dispatch network, dispatch services are provided via a visited dispatch application server after IMS registration in the visited network. Dispatch call messaging on the visited network is routed through the visited P-CSCF, bypassing the S-SCSF of the IMS infrastructure. After successful IMS registration, IMS application services are routed through the IMS core infrastructure.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
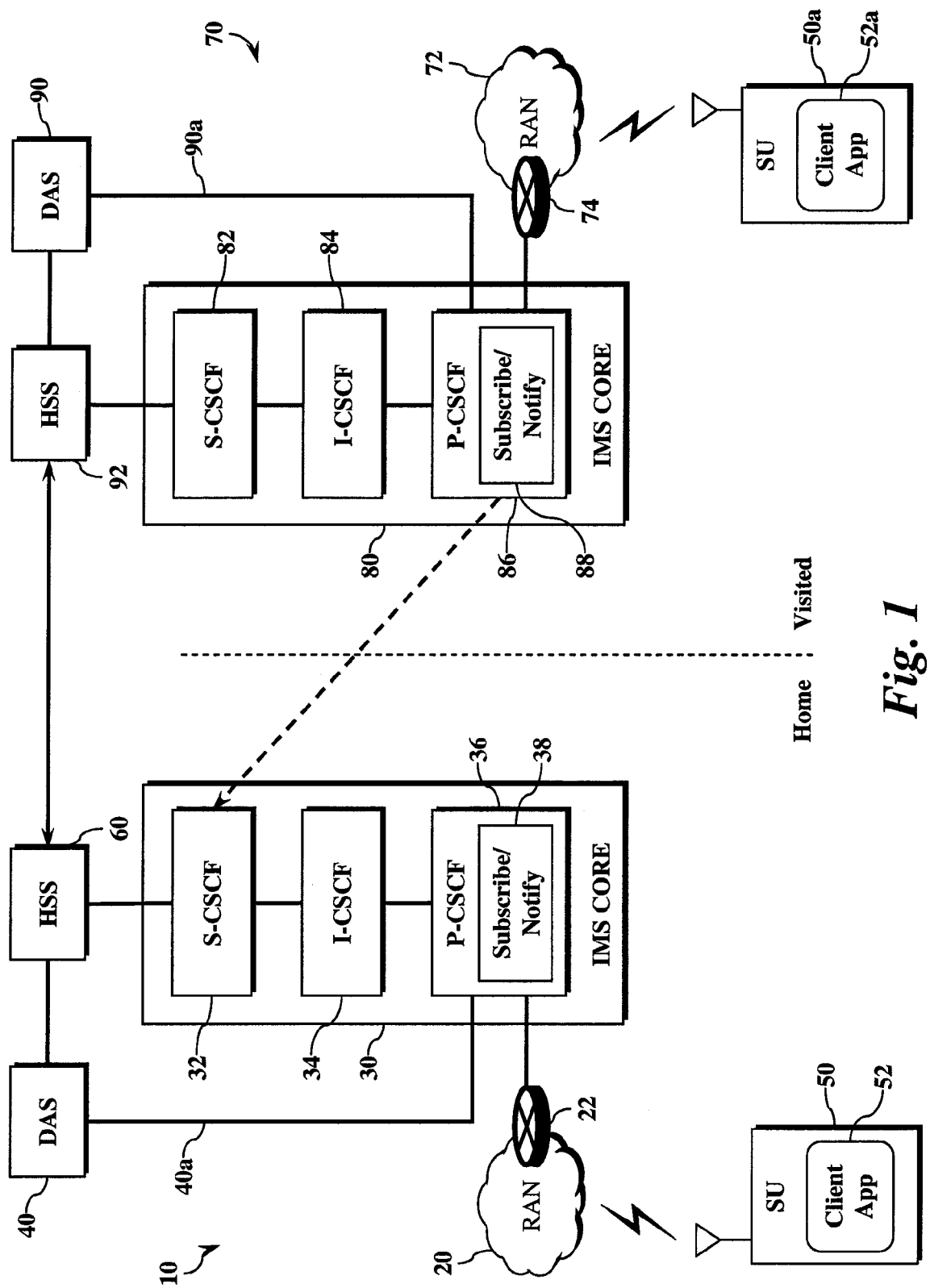
FIG. 1 is a high level block diagram illustrating home and visited wireless communications systems in accordance with an embodiment of the present invention.

An exemplary embodiment of the present invention will now be described with reference to FIG. 1. A communications network 10 includes a radio access network (RAN) 20, an IP Multimedia Subsystem (IMS) Core infrastructure 30 and a dispatch application server 40. The RAN 20 is a multiple access wireless communications system that provides wireless packet data communications to a plurality of wireless subscriber units, such as subscriber unit (SU) 50. In the exemplary embodiment, the RAN 20 includes a 3G CDMA2000 1xEV-DO network, the dispatch application server 40 provides high performance dispatch services, and the subscriber unit 50 includes a high performance dispatch client application 52. The subscriber unit 50 may include any device that is adapted to communicate with the RAN 20, such as a mobile telephone, a personal digital assistant or a portable computer. A Home Subscriber Server (HSS) 60 includes a database storing subscriber information for use by the IMS Core 30, including user profiles and subscriber location, and facilitates user authentication and authorization functions for the IMS Core 30.

The IMS Core 30 includes a plurality of Session Initiation Protocol (SIP) servers providing Call Session Control Functions (CSCFs), including a Serving-CSCF (S-CSCF) 32, an Interrogating-CSCF 34, and a Proxy-CSCF (P-CSCF) 36. In the exemplary embodiment, the S-CSCF 32 is a SIP server providing IMS signaling and session control, and is interfaced with the HSS 60. The S-CSCF 32 handles SIP registrations of client devices and routes SIP messages between an application server and subscriber unit 50.

The I-CSCF 34 is a SIP proxy server that interfaces the home network 10 with a foreign network. The I-CSCF 34 routes SIP data packets received from a roaming subscriber unit on a foreign carrier network (not shown) to the S-CSCF 32. When a subscriber unit associated with a foreign carrier network roams onto the home network region 10, the P-CSCF 36 routes SIP data packets received from the roaming subscriber unit to the I-CSCF of the foreign carrier network. When a subscriber unit roams to a visited network region, such as region 70, the visited P-CSCF 86 routes SIP data packets received from a roaming subscriber unit 50a to the home S-CSCF 32.

The P-CSCF 36 is a SIP proxy server that provides the primary IMS interface with subscriber unit 50. The P-CSCF 36 communicates with the RAN 20 through a packet data network gateway 22, which may be a PDSN in a CDMA network, a GGSN in a GPRS/HSDPA/W-CDMA network, or an ASN gateway in WiMAX networks. In contrast to a conventional systems, the P-CSCF 36 of the exemplary embodiment includes a subscribe/notify function 38 allowing application servers, such as DAS 40, to subscribe with the P-CSCF 36 to receive notification of new IMS registration events, including new subscriber registrations. The DAS 40 is interfaced with the IMS Core 30 through the HSS 60, which facilitates the P-CSCF subscribe/notify services 38 by storing subscriber registration data and notifying the DAS 40 of changes to the stored subscriber data.

In the exemplary embodiment, the DAS 40 is also interfaced, via interface 40a, with the RAN 20 and the packet data network 22, and is optimized to provide high performance dispatch communications signaling and media communications to subscriber unit 50. In this embodiment, the P-CSCF 36 includes a session border controller and all call processing messages are routed through the P-CSCF 36. In an alternate embodiment, the session border controller is integrated into a router of the packet data network 22, allowing call processing signaling and messaging to be routed between the DAS 40 and subscriber unit 50, with or without routing through the P-CSCF 36.

Figure 2:
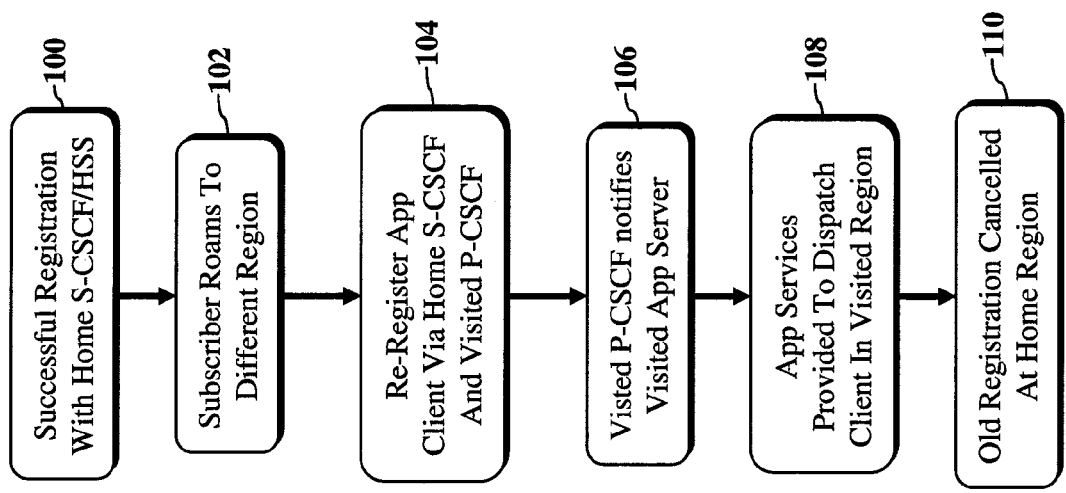
FIG. 2 is a flow diagram illustrating an operation of the embodiment of FIG. 1.

An embodiment of an operation of FIG. 1 will now be described with reference to FIG. 2. In step 100, the subscriber unit 50 registers its SIP URI with the home S-CSCF 32 and HSS 60. The subscriber unit 50 first establishes wireless communications with the RAN 20, a packet data session is activated, and the client application 52 is launched to initiate IMS registration. After establishing wireless communications with the RAN 20, the subscriber unit 50 discovers the P-CSCF 36 through the packet data network 22's discovery functions, such as through a Dynamic Host Configuration Protocol (DHCP) server. The subscriber unit 50 sends a Register message to the P-CSCF 36 using the SIP protocol to register the user's SIP URI with the S-CSCF 32/HSS 60 in the home network. Authentication and authorization of the user is performed by the S-CSCF 32/HSS 60. Upon successful authentication and authorization, the S-CSCF 32 embeds application specific parameters in the SIP OK message before forwarding to the P-CSCF 36, which in turn forwards the SIP OK message to the subscriber unit 50. Upon successful registration, P-CSCF 36 then locally stores a registration state for the subscriber that includes the subscriber identifier, application specific parameters and security parameters. The IMS signaling messages between the subscriber unit 50 and the IMS core 30 are directed through the P-CSCF 36 which routes IMS messages between the subscriber unit 50 and the S-CSCF 32. In one embodiment, the P-CSCF 36 includes a Policy Decision Function (PDF) to provide policy control, such as management of quality of service through the IMS Core 30. After registration, the P-CSCF 36 subscribe/notify function 38 notifies the DAS 40 of the user registration associated with the subscriber unit 50, including a subscriber identifier and application specific parameters. The subscriber unit 50 may then access dispatch application services, as well as applications available through the IMS Core infrastructure 30.

In step 102, the subscriber unit 50a roams to a visited region 70 or foreign network (not shown) and establishes wireless communications with a RAN 72. The visited region 70 may be a region of the home network 10 having a common administrative domain. The visited region 70 includes a packet data network 74 connecting the RAN 72 to an IMS Core 80, which includes an S-CSCF 82, an I-CSCF 84 and a P-CSCF 86. In the exemplary embodiment, the P-CSCF 88 includes the subscribe/notify function 88 described herein. A dispatch application server 90 provides dispatch communications to the subscriber unit 50a, and a visited HSS 92 stores information for subscribers of the visited network 70.

In step 104, the subscriber unit 50a discovers the address of the visited P-CSCF 86 through the local network 74 service discovery functions and sends an IMS registration message to the P-CSCF 86. The P-CSCF 86 queries the visited S_CSCF 82 and HSS 92 for the subscriber unit's 50a user information and home network. A Subscriber Location Function (SLF) in the HSS 92 obtains the subscriber unit's home network and returns the subscriber unit's routing information to the P-CSCF 86. The P-CSCF 86 sends the registration request to the home S-CSCF 32. After a successful registration, a SIP OK message is returned to the subscriber unit 50a through the P-CSCF 86. In step 106, the visited P_CSCF 86 subscribe/notify function 88 notifies the DAS 90 of the new registration (e.g., via the HSS 92), and in step 108 the DAS 90 provides dispatch application services to the subscriber unit 50a via the interface 90a. In contrast to conventional IMS operation, the dispatch signaling and media messages between the DAS 90 and the subscriber unit 50a are directed to interface 90a, bypassing the S-CSCF 82 of the IMS core 80. In step 110, the old registration at the home network 10 is cancelled.

As illustrated in the exemplary embodiment, the present invention provides numerous advantages over prior art systems. Combining registration for high performance dispatch services with other IMS registrations reduces processing and over the air communications associated with registration. The combined registration also facilitates efficient updating of presence information by a presence server, which may issue a single presence event for all registered applications. The network configuration of the exemplary embodiment further facilitates proprietary high performance dispatch communications by bypassing the standard IMS call processing (i.e., S-CSCF).

Figure 3:
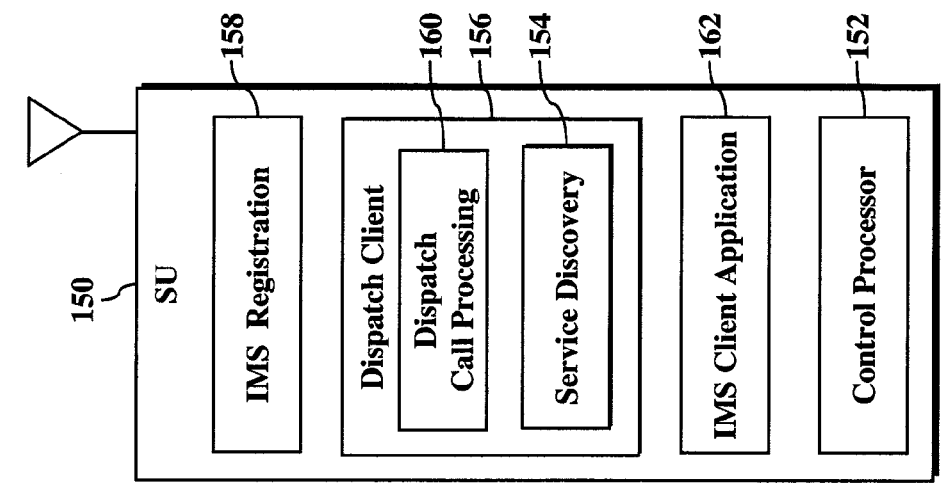
FIG. 3 is a block diagram illustrating an embodiment of a wireless subscriber unit in accordance with an embodiment of the present invention.

Referring to FIG. 3, an embodiment of a subscriber unit 150 will now be described. The subscriber unit 150 includes a control processor 152, a dispatch client application 156 and an IMS client registration function 158. The subscriber unit 150 may also include one or more IMS client applications 162. The dispatch client application 156 includes functional components for service discovery 154 and dispatch call processing 160, which may be conventional dispatch client functional components. The IMS client registration function 158 facilitates IMS registration for the dispatch client 156 and IMS client application 162.

The dispatch client application 156 is adapted to register for dispatch application services utilizing the IMS client registration function 158. In operation, the dispatch client application 156 instructs the IMS client registration function 162 to register the subscriber for dispatch application services. After the IMS client registration function 158 successfully registers with an IMS network, it notifies the dispatch client application 156 of the registration and forwards communications parameters for the dispatch session. If the local P-CSCF includes a session border control function, signaling and media communications between the dispatch client application 156 and the dispatch application server are then routed through the local P-CSCF while bypassing standard IMS call processing through the S-CSCF of the wireless network. If the session border control function is provided in another network element, the signaling and media communications between the client application and dispatch application server will bypass both the P-CSCF and S-CSCF.

Figure 4:
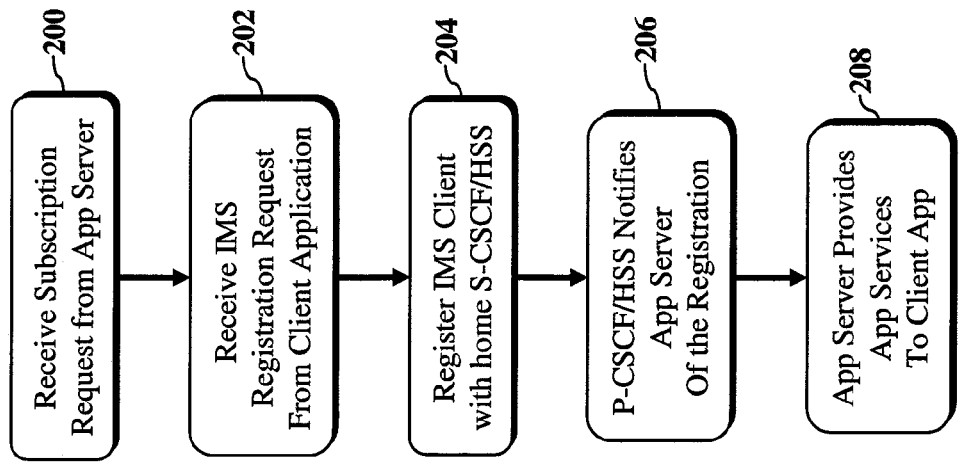
FIG. 4 is a flow diagram illustrating an operation of a P-CSCF in accordance with an embodiment of the present invention.

Referring to FIG. 4, an embodiment of an operation of the P-CSCF of the exemplary embodiment will now be described. In step 200, the P-CSCF receives a subscription request from an application server. In step 202, the P-CSCF receives an IMS registration request from an IMS client, and facilitates the registration with the home S-CSCF/HSS in step 204. Upon successful authentication and authorization of the subscriber, the S-CSCF embeds application specific parameters in the SIP OK message before sending to the P-CSCF 36. Upon successful registration, P-CSCF 36 then locally stores a registration state for the subscriber that includes the subscriber identifier application specific parameters and security parameters. The P-CSCF then notifies the application server of the subscriber identifier and associated application specific parameters in step 206. The application server provides applications services, such as dispatch communications, to the client application in step 208.

Figure 5:
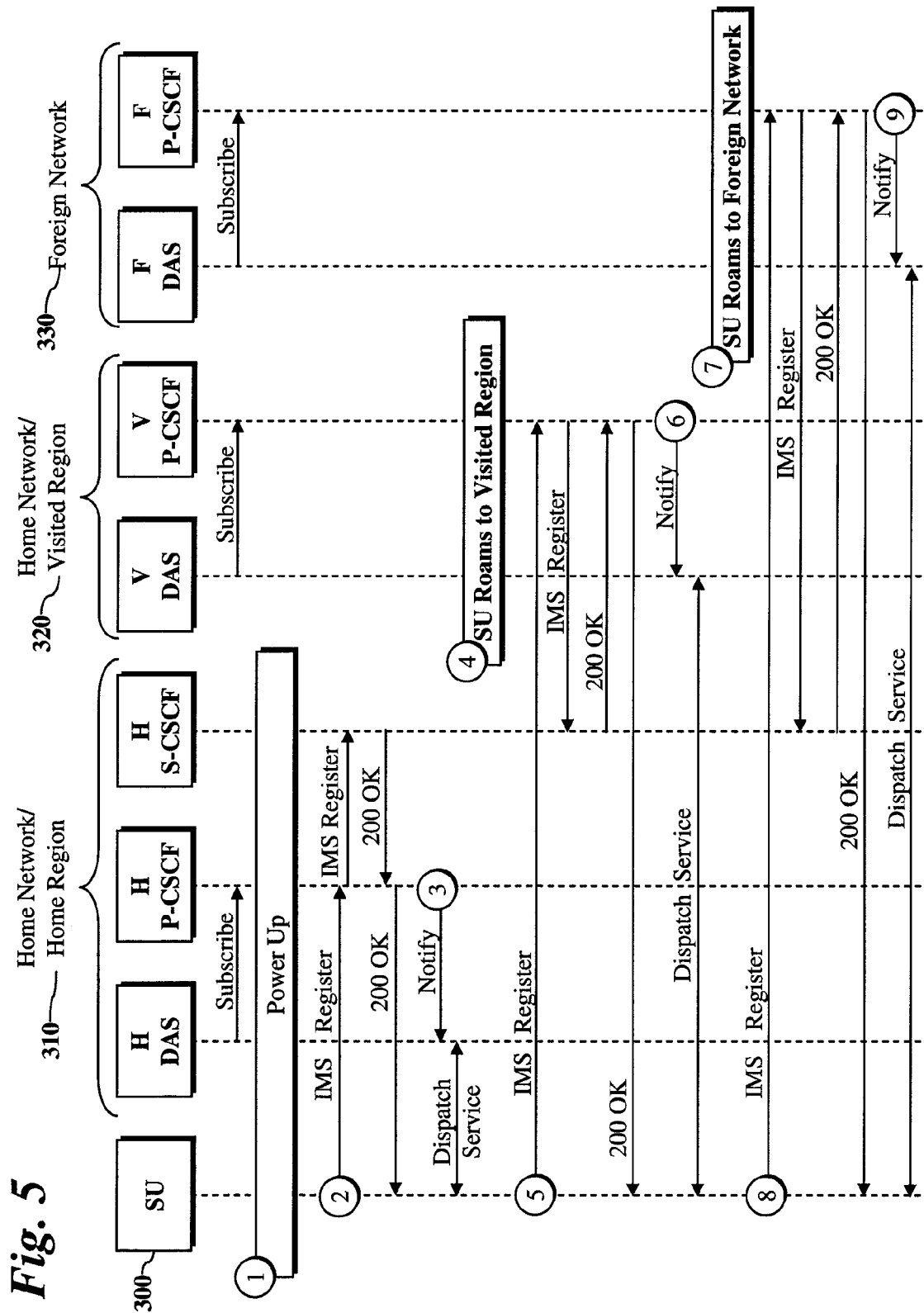
FIG. 5 is a call flow diagram illustrating an embodiment of dispatch subscriber unit across IMS-based networks in accordance with an embodiment of the present invention.
Figure 6:
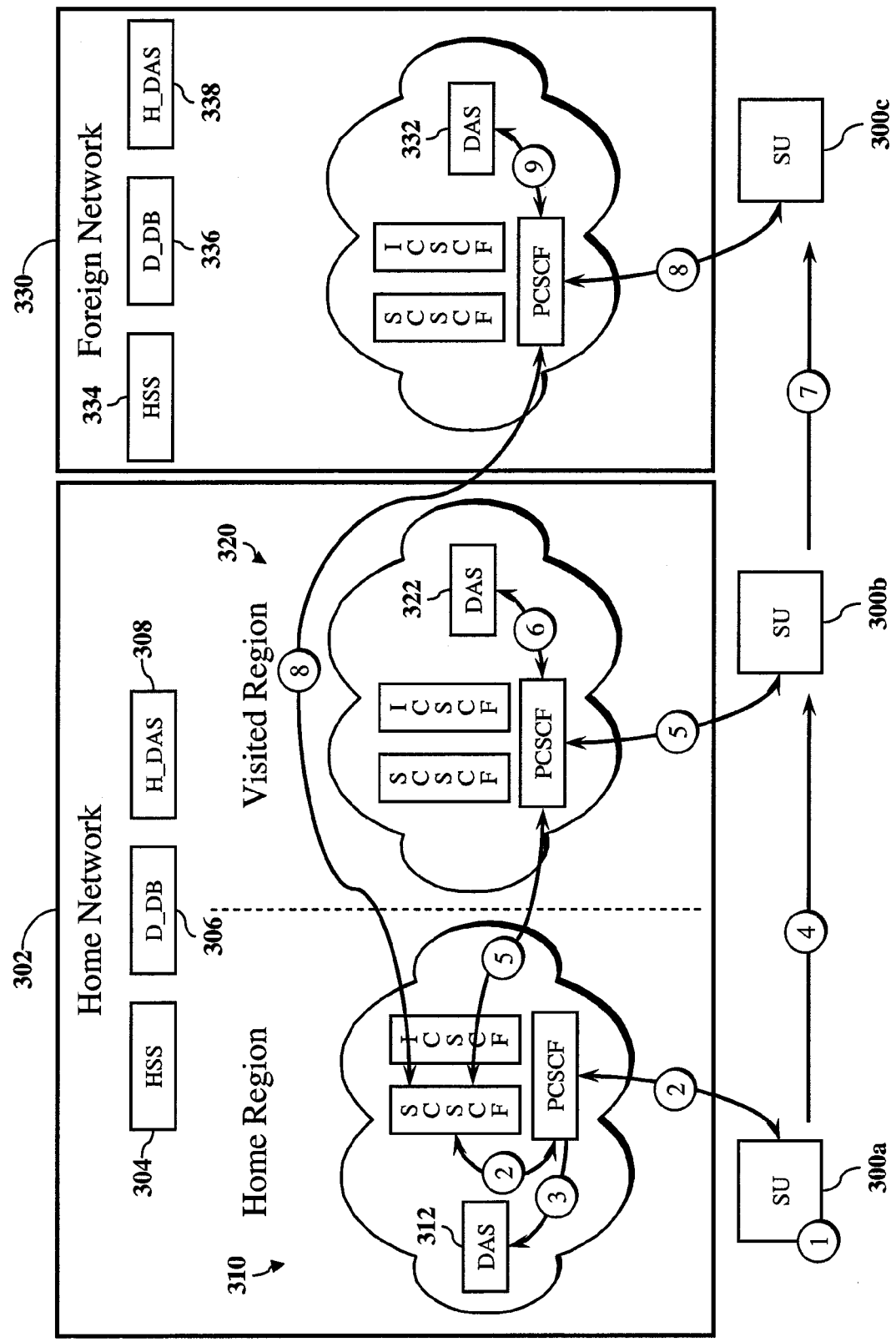
FIG. 6 illustrates an embodiment of dispatch subscriber unit roaming across IMS-based networks.

Referring to FIGS. 5 and 6, another embodiment of dispatch roaming with IMS registration is illustrated. In this embodiment, a subscriber unit 300 roams from home network 310, to a visited region 320 of the home network, and finally to a foreign network 330. The home network 310 and foreign network 330 include IMS Home Subscriber Servers (HSS) 304 and 334, respectively, home dispatch application servers (H_DAS) 308 and 338, respectively, and databases 306 and 336 storing dispatch subscriber information and interfacing with the respective local HSS. Each region 310 and 320, and the Foreign network 330, includes an IMS core infrastructure including a P-CSCF, an I-CSCF and an S-CSCF.

Local dispatch application servers (DAS) 312, 322 and 332, respectively, are also provided. Initially, each dispatch application server is provided with an active subscription to the IMS registration notification services of the local P-CSCF. In step 1, the subscriber unit 300 powers up in the home region 310 of the home network 302 and establishes wireless communications with the home region 310. In step 2, the subscriber unit 300 transmits an IMS Register message to the P-CSCF which forwards the message to the S-CSCF for authentication via the HSS 304. If the subscriber unit 300 is authenticated, then a SIP 200 OK message is returned by the S-CSCF to the P-CSCF and then to the SU 300. In step 3, the P-CSCF notifies the dispatch application server 312 of the subscriber unit registration. In one embodiment, the dispatch application server 312 transmits the registration to a home dispatch application server 308, which manages active dispatch registrations on the home network 302. The subscriber unit 300 may then receive dispatch application services through the dispatch application server 312. In the exemplary embodiment, call processing between the dispatch application server 312 and the subscriber unit 300 is routed though the P-CSCF, without using the IMS call processing of the S-CSCF.

In step 4, the subscriber unit roams to the visited region 320 of the home network 302. The subscriber unit 300 is adapted to re-register upon roaming to a new network or region. In step 5, the subscriber unit 300 discovers the local P-CSCF and transmits an IMS Register message to the P-CSCF, which forwards the message to the subscriber's home S-CSCF. If authentication of the subscriber unit 300 through the home S-CSCF/HSS is successful, then the home S-CSCF transmits a SIP 200 OK message to the visited P-CSCF which forwards the message to the subscriber unit. In step 6, the visited P-CSCF notifies the visited dispatch application server 322 of the subscriber registration, and the dispatch application server 322 (and home dispatch application server 308) provide dispatch application services to the subscriber unit 300.

Without IMS dispatch registration, the subscriber unit 300 would register with both the IMS core infrastructure and, separately, the dispatch application server. In one approach, a dispatch client would first register through a location server. Next a dispatch application server would authenticate the subscriber's dispatch subscription via an authentication server. The dispatch registration would then be passed to the home dispatch application server which resolves dispatch conflicts. In contrast, the IMS dispatch registration of the exemplary embodiment provides subscribe/notify functionality at the P-CSCF and a new network architecture which simplifies the dispatch authentication/registration process.

In step 7, the subscriber unit roams to the foreign network 330. The subscriber unit 300 establishes wireless communications with the foreign network 330 and discovers the address of the foreign P-CSCF. The foreign P-CSCF receives an IMS Register message from the subscriber unit 300, determines the subscriber unit's home network via the HSS 334 and identifies the subscriber unit's home I-CSCF, such as through a DNS query. The foreign P-CSCF transmits the IMS Register message to the home S-CSCF through the home I-CSCF. If the subscriber unit is authenticated, then the home S-CSCF returns a SIP 200 OK to the foreign P-CSCF which forwards the SIP 200 OK to the subscriber unit. In step 9, the foreign P-CSCF notifies the foreign DAS 332 of the subscriber unit registration, and the foreign DAS 332 passes the subscriber unit's registration to the home DAS 338 and provides dispatch application services to the subscriber unit 300.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. A method for providing application services to a subscriber unit in a wireless communications system comprising at least one application server providing application services to the subscriber unit, and an IP Multimedia Subsystem (IMS) infrastructure including a Proxy-Call Session Control Function (P-CSCF) and a Serving-Call Session Control Function (S-CSCF), the method comprising:
   receiving by the P-CSCF a subscription request from the application server requesting the P-CSCF to notify the application server of IMS registrations via IMS subscriber registration notification messages;
   transmitting by the P-CSCF an IMS subscriber authentication request message to the S-CSCF upon receipt of the IMS subscriber registration request message from the subscriber unit; and
   transmitting by the P-CSCF an IMS subscriber registration notification message to the application server upon receipt of a message from the S-CSCF authenticating the subscriber unit and indicating successful IMS registration of the subscriber unit, wherein the message comprises an identifier of a user associated with the subscriber unit,
   wherein, upon receipt of the IMS subscriber registration notification message, the application server provides the subscriber unit with application services, and communications between the subscriber unit and the application server bypass the S-CSCF of the IMS infrastructure.

2. The method of claim 1 wherein the P-CSCF includes a session border control function and the communications between the subscriber unit and the application server are routed through the P-CSCF.

3. The method of claim 1 wherein the wireless communications system further includes a session border controller, and wherein the communications between the subscriber unit and the application server are routed through the session border controller, bypassing the P-CSCF.

4. The method of claim 1 wherein the IMS subscriber registration notification message further includes application specific parameters.

5. The method of claim 1 wherein the application server is a high performance dispatch application server.

6. The method of claim 1 wherein the application server is a QChat server.

7. The method of claim 1 further comprising: receiving at the application server a notification message from the IMS infrastructure that the subscriber unit roamed to a second network, and terminating the dispatch application services provided to the subscriber unit.

8. A method for providing applicant services to a subscriber unit a wireless communications system comprising at least one application server for providing application services to the subscriber unit, and an IP Multimedia Subsystem (IMS) infrastructure including a Proxy-Call Session Control Function (P-CSCF) and a Serving-Call Session Control Function (S-CSCF), the method comprising:
   receiving by the P-CSCF a subscription request from the application server requesting the P-CSCF to notify the application server of IMS registrations via IMS subscriber registration notification messages;
   receiving by the P-CSCF an IMS subscriber registration request from the subscriber unit;
   transmitting by the P-CSCF an IMS subscriber authentication request message to the S-CSCF upon receipt of the IMS subscriber registration request message from the subscriber unit; and
   creating by the P-CSCF a registration state for a user of the subscriber unit and notifying the application server of the registration of the user of the subscriber unit in accordance with the subscription request upon receipt of a message from the S-CSCF authenticating the subscriber unit and indicating successful IMS registration of the subscriber unit,
   wherein the P-CSCF includes an SIP subscribe and notify function for subscribing the application server and notifying the application server of successful IMS subscriber registration requests.

9. The method of claim 8 wherein the P-CSCF includes a session border control function and the communications between the subscriber unit and the application server are routed through the P-CSCF.

10. The method of claim 8 wherein the wireless communications system further includes a session border controller, and wherein the communications between the subscriber unit and the application server are routed through the session border controller, bypassing the P-CSCF.

11. The method of claim 8 wherein the notifying the application server includes transmitting a message to the application server including an identifier of the user of the subscriber unit and application specific parameters.

12. The method of claim 11 wherein the application specific parameters include authentication and authorization data associated with the user.

13. The method of claim 11 wherein the application server is a high performance dispatch application server, and the application specific data includes location information and authentication and authorization data, whereby the application server authenticates the user based on the received application specific data.

14. The method of claim 8 wherein the application server is a QChat server.

15. The method of claim 8 wherein call processing between the application server and the subscriber unit bypasses the S-CSCF.

16. The method of claim 8 wherein the wireless communications system further includes an IMS application server, the method further comprising facilitating IMS application services between the subscriber unit and the IMS application server through the P-CSCF and the S-CSCF.

17. The method of claim 8 wherein notifying further comprises determining a home network of the user and forwarding the received IMS registration request to an associated home S-CSCF.

* * * * *